(12) United States Patent
Marquez Costa (10) Patent No.: US 11,560,104 B2
(45) Date of Patent: Jan. 24, 2023

(54) SPRING CLIP (71) Applicant: ILLINOIS TOOL WORKS INC., Glenview, IL (US)

(72) Inventor: Josep Lluis Marquez Costa, Granollers (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/243,122

(22) Filed: Apr. 28, 2021

(65) Prior Publication Data
US 2021/0347313 A1 Nov. 11, 2021

(30) Foreign Application Priority Data
May 7, 2020 (EP) .................................... 20382376

(51) Int. Cl.
*B60R 13/02* (2006.01)
*F16B 2/22* (2006.01)

(52) U.S. Cl.
CPC ............ *B60R 13/0206* (2013.01); *F16B 2/22* (2013.01)

(58) Field of Classification Search
CPC ...... B60R 13/0206; F16B 2/22; F16B 5/0657; F16B 5/0642; F16B 12/38; Y10T 24/307; Y10T 24/304; Y10T 24/45099
See application file for complete search history.

(56) References Cited

U.S. PATENT DOCUMENTS

| | | | |
|---|---|---|---|
| 2,154,711 A | 4/1939 | Uum | |
| 2,199,347 A | 4/1940 | Roethel | |
| 2,598,776 A | 6/1952 | Flora | |
| 2,817,131 A | 12/1957 | Seegers | |
| 3,092,176 A | 6/1963 | Hyman | |
| 4,180,247 A | 12/1979 | Pfarr | |
| 5,403,034 A * | 4/1995 | Gans | ..................... B60R 21/216 403/294 |
| 6,074,150 A * | 6/2000 | Shinozaki | ........... B60R 13/0206 24/297 |
| 6,796,006 B2 * | 9/2004 | Hansen | ................. F16B 21/075 24/297 |
| D572,129 S * | 7/2008 | Keays | ............................. 24/453 |
| 8,272,613 B2 | 9/2012 | Golle | |

(Continued)

FOREIGN PATENT DOCUMENTS

EP 2309139 A1 4/2011

*Primary Examiner* — Robert Sandy
*Assistant Examiner* — Rowland Do
(74) *Attorney, Agent, or Firm* — Thompson Hine LLP (57) ABSTRACT

A spring clip for coupling a panel to a vehicle structure having at least one mounting member, includes a base portion, with upper and lower surface, configured to couplingly engage with the mounting member, and a body portion, having a central axis extending away from the lower surface of the base portion and having a first planar wall member and a second planar wall member, opposingly spaced apart from the first wall member with regards to the central axis, each one of the planar wall members extending away from the lower surface towards and joiningly converging into a distal end on the central axis. The body portion further includes at least a first pair of opposing retention elements, each one disposed on and extending laterally outwards from a respective one of the planar wall members, configured to fixingly engage when inserted into an orifice of the panel, during use.

16 Claims, 5 Drawing Sheets

(56) References Cited

U.S. PATENT DOCUMENTS

| | | | | |
|---|---|---|---|---|
| 8,683,662 B2* | 4/2014 | Cooley | ............... | F16B 5/0664 |
| | | | | 24/453 |
| 10,677,277 B2* | 6/2020 | Bidlake | ................. | F16B 2/245 |
| 2006/0230587 A1* | 10/2006 | Okada | ............... | B60R 13/0206 |
| | | | | 24/297 |
| 2007/0186389 A1* | 8/2007 | Smith | ................. | F16B 21/076 |
| | | | | 24/297 |
| 2013/0199003 A1* | 8/2013 | Iwahara | .............. | F16B 21/075 |
| | | | | 24/530 |
| 2014/0363224 A1* | 12/2014 | Iwahara | ................ | F16B 5/065 |
| | | | | 403/326 |
| 2016/0068118 A1* | 3/2016 | Benedetti | ............ | F16B 5/0657 |
| | | | | 24/458 |
| 2020/0400180 A1* | 12/2020 | Steltz | .................. | F16B 5/0657 |

* cited by examiner

SPRING CLIP

The present invention relates to a spring clip for use in a vehicle. In particular, the present invention relates to a spring clip for fastening a panel to a vehicle.

BACKGROUND

It is generally known in the motor vehicles sector that it is required to fasten components to a vehicle. Various types of fasteners are used in motor vehicle applications, for example, under the hood or inside panels of the vehicle. A fastener that is widely used in a vehicle is a fastening clip, often referred to as a spring clip. Spring clips are used to secure trim parts, such as vehicle panels, to a vehicle.

Conventional spring clips are typically used in the fitting of vehicle panels to vehicle structures. They may be used to fit a panel to a vehicle structure in a high impact area. Spring clips generally have relatively high installation forces, i.e. they require a considerable force (e.g. a pushing force) to move the clip into a respective aperture of the vehicle structure. However, the relatively high force required for installation can pose difficulties to manufacturers and users (e.g. in case of manual assembly). In some configurations, additional components or parts may be required in order to facilitate the attachment of the clip to the structure. This need for additional tooling or additional parts, such as screws or other fasteners, can significantly increase the complexity, as well as, subsequent cost of the manufacturing process. Further, the additional parts required for the assembly may also unnecessarily increase the total weight of the clip assembly. Also, in the event vehicle parts have to be removed for repair or replacement due to damage, it will be necessary to first extract the spring clips from the assembly. However, many of the conventional spring clips do not facilitate multiple reinstallations as the clips may degrade or break over time. Moreover, clips should have a sufficient retention force once installed, so that the clip is not disengaged unintentionally during use. Also, typical spring clips are usually designed for a specific structure thickness.

Consequently, it would be desirable to provide an improved spring clip that can alleviate or mitigate one or more of the aforementioned problems. In particular, it is an object of the invention to provide a spring clip with improved retention characteristics, including a relatively low insertion force and a relatively high resistance to removal, as well as, an improved versatility, for example, to allow for a range of different thicknesses, at a minimised weight and complexity.

The present invention provides at least an alternative to the spring clips of the prior art.

SUMMARY

In accordance with the present invention there is provided a spring clip according to the appended claims.

According to an aspect of the present invention, there is provided a spring clip for coupling a panel to a vehicle structure having at least one mounting member. The spring clip comprises a base portion, having an upper and lower surface, configured to couplingly engage with the mounting member, and a body portion, having a central axis extending away from the lower surface of the base portion and comprising a first planar wall member and a second planar wall member, opposingly spaced apart from the first planar wall member with regards to the central axis. Each one of the first and second planar wall members extend away from the lower surface towards and joiningly converging into a distal end on the central axis. The body portion further comprises at least a first pair of opposing retention elements, each one disposed on and extending laterally outwards from a respective one of the first and second planar wall member, configured to fixingly engage when inserted into an orifice of the panel, during use.

This provides the advantage of a versatile clip that can be manufactured out of a single piece of material and that is configured to be used for a range of different panel thicknesses. In particular, the opposing planar wall members provide an improved stability and strength, while also being flexible in at least one direction (e.g. resiliently bendable towards the central axis) to minimise the pushing force required during insertion. Further, the pair of opposing retention element provides for an improved retention force (e.g. resistance to pull), because the retention elements protrude directly from the planar wall members, rather than being separate entities.

Advantageously, the spring clip may comprise a second pair of opposing retention elements. The second pair of opposing retention elements are laterally spaced apart from the first pair of opposing retention elements on an outer wall surface of a respective one of the first and second planar wall members. By providing a second pair of opposing retention elements that are laterally spaced apart from the first pair of opposing retention elements on an outer wall surface of respective planar wall members, the retention elements are placed so as to contact and fixingly engage with an orifice of the panel at spaced apart regions. This increases the retention performance of the clip, whilst ensuring that the spring clip can be removed when desired. The provision of a first pair of opposing retention elements and a second pair of opposing retention elements that are spaced apart is particularly advantageous because the separation provides retention elements that engage with the orifice of the panel over a larger area, allowing force to be distributed more evenly.

Advantageously, each one of the first pair of opposing retention elements and the second pair of opposing retention elements may form a shoulder portion adapted to lockingly engage with a surface of the panel, during use. This allows the spring clip to be placed in a predetermined position. That is, the shoulder portion provides a locating function, placing the panel at a selected position relative to the vehicle structure. The provision of the shoulder prevents the spring clip from relocating once it has been fixed in the desired position.

Advantageously, each one of the first and second planar wall members may be resiliently biased in a direction laterally away from the central axis. This allows the first and second planar wall members to engage with the panel in a snap-fit manner when the spring clip is inserted into the orifice of the panel. The opposing retention elements of the respective first and second planar wall members may resiliently bias in a direction laterally away from the central axis.

Advantageously, the first planar wall member and the second planar wall member may be cooperatively deformable so as to temporarily reduce the lateral cross sectional area of the body portion.

Advantageously, each one of the first pair of opposing retention elements may be integrally formed from a respective one of the first and second planar wall member.

Advantageously, each one of the second pair of opposing retention elements may be integrally formed from a respective one of the first and second planar wall member.

Advantageously, the body portion may comprise a polymer. By providing a body portion that comprises a polymer, when the spring clip is inserted in the vehicle structure, the extent of wear or corrosion may be reduced. The reduction of wear and corrosion is beneficial, because it allows the spring clip to be reinstalled more often compared to, for example, metal spring clips. In some examples, the body portion may comprise a plastic material. In some examples, the body portion comprises polyoxymethylene (POM).

Advantageously, the polymer may comprise one or more of polypropylene, polyvinyl chloride and polyethylene. In some examples, the polymer may comprise polyoxymethylene.

Advantageously, the spring clip may further comprise a first rib member extending from the first planar wall member towards the distal end. This improves the rigidity and strength of the spring clip. More particularly, the provision of a rib member that extends from the first planar wall member allows the deformation of the spring clip, as it is inserted into the orifice of a panel, to be in a controlled way.

Advantageously, the first rib member may be integrally formed with the first planar wall member.

Advantageously, the spring clip may further comprise a second rib member extending from the second planar wall member towards the distal end. This further improves the rigidity and strength of the spring clip.

Advantageously, the second rib member may be integrally formed with the second planar wall member.

Advantageously, the central axis of the body portion may extend substantially perpendicularly away from the lower surface of the base portion.

Advantageously, the upper and lower surfaces may be orientated in a plane that intersects the central axis of the body portion.

BRIEF DESCRIPTION OF THE DRAWINGS

Embodiments of the invention are now described, by way of example only, hereinafter with reference to the accompanying drawings, in which.

DETAILED DESCRIPTION

The described example embodiment relates to a spring clip, and particularly a spring clip for fastening a panel to a vehicle. The invention is, however, not limited to a spring clip for fastening a body panel to a vehicle. For example, the spring clip may be for fastening any structural member to another structural member, for example, a vehicle trim part, such as an interior surface cover, to a vehicle.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

Like reference numerals are used to depict like features throughout.

Figure 1:
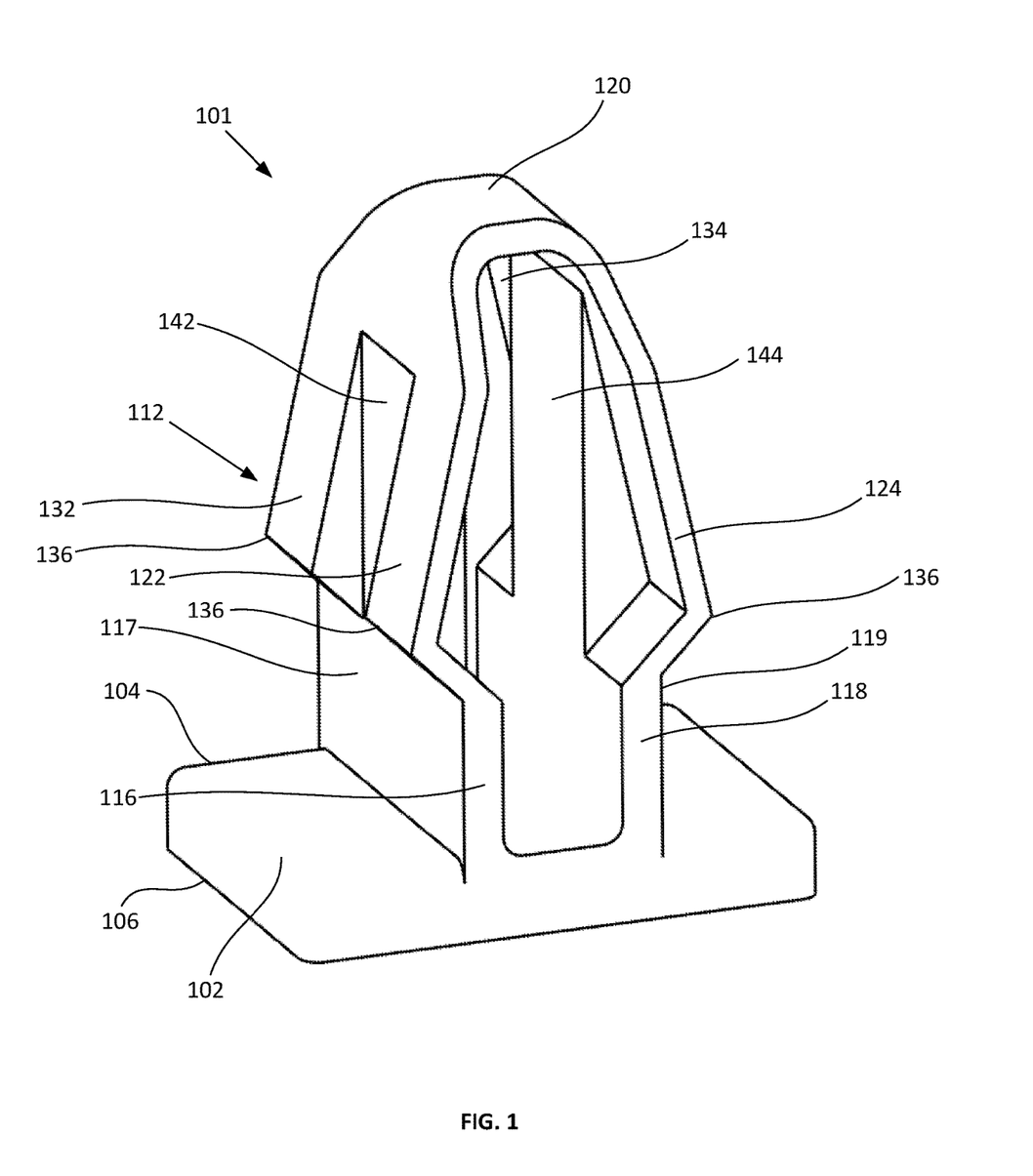
FIG. 1 illustrates a schematic perspective view of a spring clip according to an example embodiment.
Figure 2:
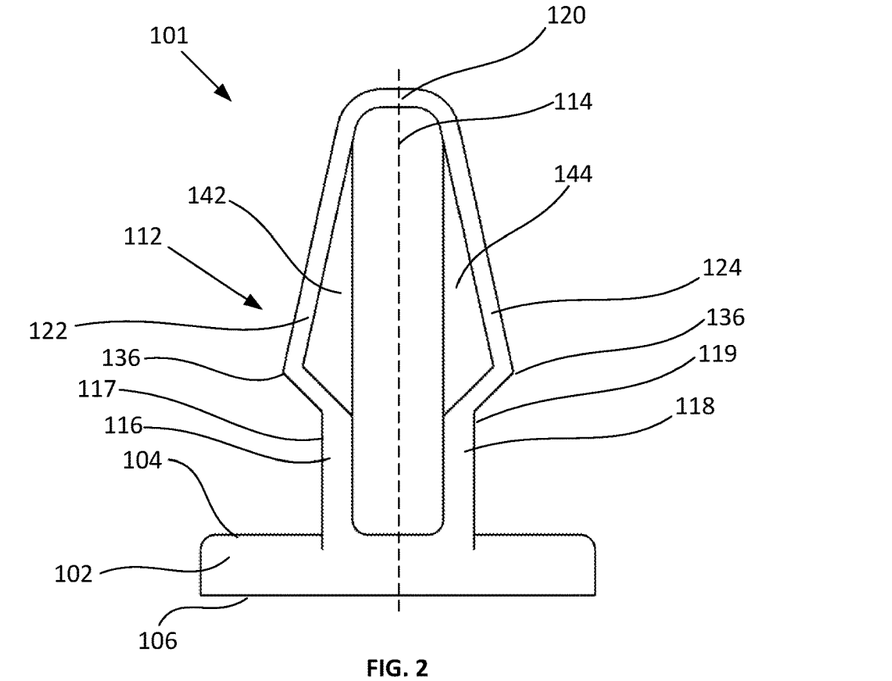
FIG. 2 illustrates a schematic front view of the spring clip of FIG. 1.

Referring firstly to FIGS. 1 to 4, there is provided a spring clip 101. The spring clip 101 is provided with a base portion 102. The base portion 102 has an upper surface 104 and a lower surface 106. The upper surface 104 and the lower surface 106 are arranged on opposing faces of the base portion 102 and are separated by a predetermined thickness of the base portion 102. In the example embodiment shown, the upper surface 104 and the lower surface 106 of the base portion 102 are substantially planar continuous surfaces. The spring clip 101 is provided with a body portion 112. As best seen in FIG. 2, the body portion 112 has a central axis 114 that extends along a longitudinal axis of the body portion 112. The upper surface 104 and the lower surface 106 of the base portion 102 are arranged so as to intersect with the central axis 114 of the body portion 112.

The body portion 112 has a first wall member 116 and a second wall member 118. The first wall member 116 and the second wall member 118 are substantially planar. The first wall member 116 has an outer wall surface 117 facing away from the central axis 114. The second wall member 118 has an outer wall surface 119 facing away from the central axis 114. The outer wall surfaces 117, 119 of the first wall member 116 and the second wall member 118 respectively face in opposite directions. In the example embodiment shown, the first wall member 116 and the second wall member 118 extend away from the base portion 102 in a direction that is substantially perpendicular to the upper 104 and lower surface 106 of the base portion 102. In other embodiments, however, the planar wall members 116, 118 may extend from the base portion 102 in a direction not perpendicular with the principle plane of the base portion 102. For example, the planar wall members 116, 118 may form an angle of 45 degrees, 60 degrees, or 75 degrees, with the base portion 102.

In this particular example embodiment, the body portion 112 is made of polypropylene. However, any other suitable material is envisaged, such as, but not limited to, polyvinyl chloride, and polyethylene. In some example embodiments, the body portion 112 may be made of polyoxymethylene.

Further, in this example embodiment, the first wall member 116 and the second wall member 118 extend along the entire width of the base portion 102 (see FIG. 1 in particular), but it is envisaged that the wall members 116, 118 may span only partially along the width of the base portion 102. The first and second planar wall members 116, 118 are opposingly spaced apart relatively to one another. That is, the second planar wall member 118 is spaced apart from the first planar wall member 116 in opposing manner such that the central axis 114 is located between the first planar wall member 116 and the second planar wall member 118. The first planar wall member 116 extends in a direction away from the lower surface 106 of the base portion 102. The first wall member 116 and the second wall member 118 extend towards and joiningly converge towards a distal end 120. The distal end 120 of the body portion 112 is located on the central axis 114.

An opposing pair of retention elements 122, 124 are provided on a respective one of the first and second wall member 116, 118. In other words, a first retention element 122 is provided on the first wall member 116 away from the base portion 102. The first retention element 122 that is disposed on the first wall member 116 extends laterally outwards from the first wall member 116 in a direction away from the central axis 114. A second retention element 124 is located on the second wall member 118 away from the base portion 102. The second retention element 124 that is disposed on the second wall member 118 extends laterally outwards from the second wall member 118 in a direction away from the central axis 114. The first retention element 122 and the second retention element 124 form a first pair of retention elements 122, 124 that are positioned in opposing relationship with one another.

Each one of the retention elements 122, 124 comprises a shoulder portion 136 that is formed between the distal end 120 and the upper surface 104 of the base portion 102. The shoulder portion 136 extends laterally outward in order to engage with a panel surface, as will be described with reference to FIG. 5.

Figure 3:
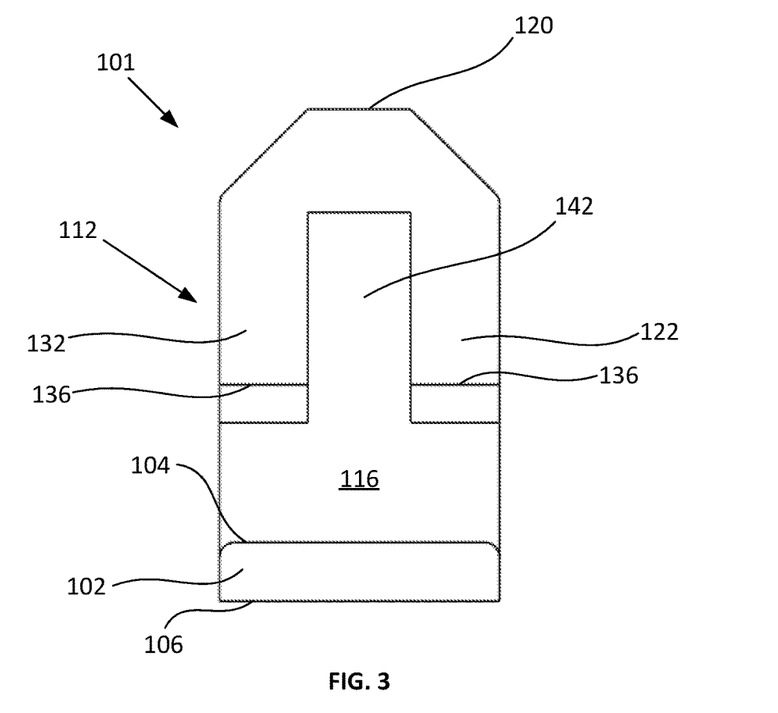
FIG. 3 illustrates a schematic side view of the spring clip of FIG. 1.
Figure 4:
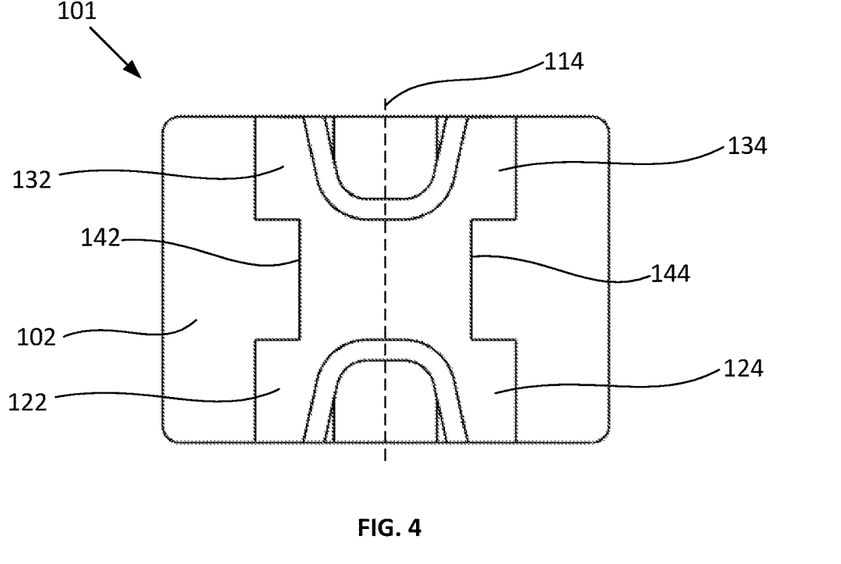
FIG. 4 illustrates a schematic top view of the spring clip of FIG. 1.

As best seen in FIGS. 1, 3 and 4, the example spring clip 101 is provided with a second pair of opposing retention elements 132, 134 in addition to the first pair of opposing retention elements 122, 124. The second pair of opposing retention elements 132, 134 are the same as the first pair of opposing retention elements 122, 124. The first pair of opposing retention elements 122, 124 and the second pair of opposing retention elements 132, 134 are displaced laterally along the respective first wall member 116 and second wall member 118. More specifically, the first retention element 122 and the third retention element 132 are laterally spaced apart on an outer wall surface 117 of the first wall member 116. The second retention element 124 and the fourth retention element 134 are laterally spaced apart on an outer wall surface 119 of the second wall member 118.

With reference in particular to FIG. 1 and FIG. 3, between the first retention element 122 and the third retention element 132 on the first wall member 116, there is provided a first rib member 142. The first rib member 142 extends from the first wall member 116 towards the distal end 120. In the embodiment shown, the first rib member 142 is integrally formed with the first wall member 116. Similarly, between the second retention element 124 and the fourth retention element 134 on the second wall member 118, there is provided a second rib member 144. The second rib member 144 extends from the second wall member 118 towards the distal end 120.

Figure 5:
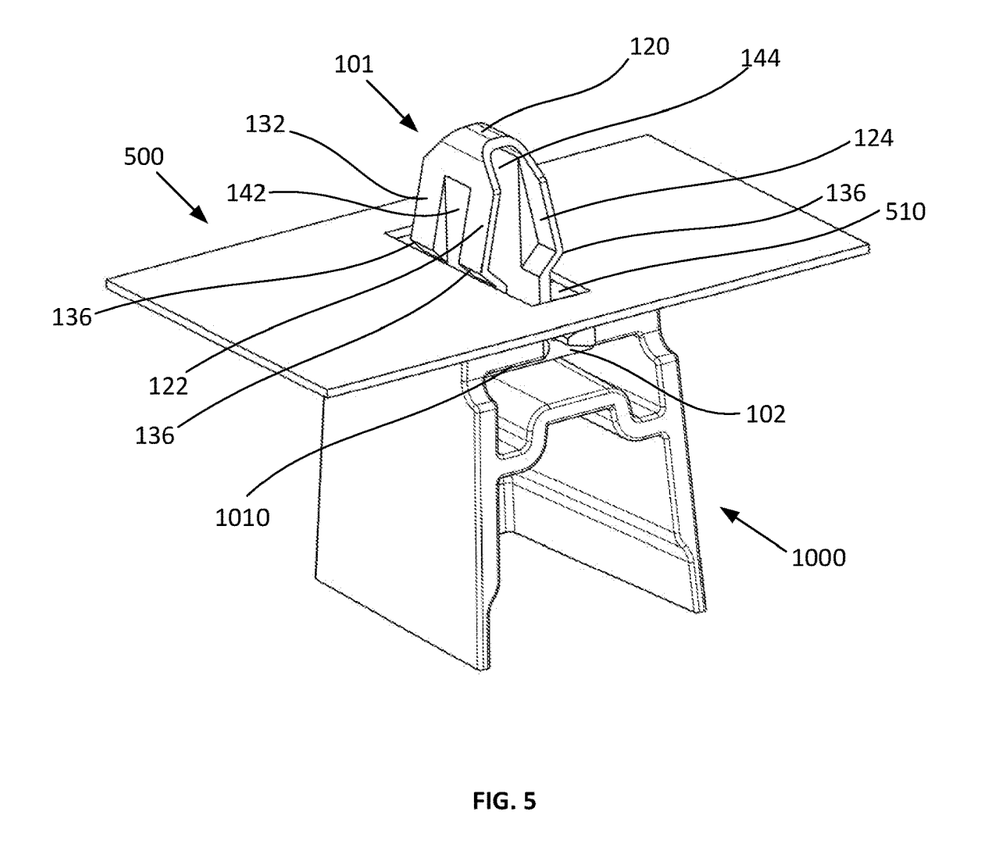
FIG. 5 illustrates a schematic perspective view of the spring clip in use coupling a panel to a vehicle structure.

Referring now to FIG. 5, there is shown a spring clip 101 as hereinbefore described, assembled with a panel 500 and a vehicle structure 1000. In this example embodiment, the vehicle structure is a dockhouse 1000. The panel 500 is illustrated as rectangular shaped panel, but it is envisaged that the panel 500 may be any shape, such as circular, square shaped, regular, irregular, or any arbitrary shape depending upon the desired application. The panel 500 is provided with an orifice 510 extending through the entire thickness of the panel 500. In this example embodiment, the orifice 510 is a slot. The dockhouse 1000 is provided with a mounting member 1010, which provides a surface for engagement of the spring clip 101 with the dockhouse 1000. A bottom surface of the mounting member 1010 has a surface for engagement with the spring clip 101. A top surface of the mounting member 1010 is located on a side opposite the bottom surface. The top surface is for engagement with the panel 500.

In use, the spring clip 101 is mounted (i.e. coupled) to the panel 500 by inserting the distal end 120 of the spring clip 101 through the orifice 510 of the panel 500. The distal end 120 of the spring clip 101 is narrower in comparison to the rest of the spring clip 101. As the spring clip 101 is inserted into the orifice 510, the retention elements 122, 124, 132, 134 come into contact with the side profiles of the orifice 510. The shoulder portion 136 extends laterally outward to abut and engage with the surface of the panel 500 during use. Each shoulder portion 136 is angled with respect to the opposing retention elements 122, 124, 132, 134. The shoulder 136 extends outward away from the central axis 114 so as to engage with the panel 500. In some example embodiments, the shoulder portion 136 of the opposing retention elements 122, 124, 132, 134 is the part of the spring clip 101 that is laterally displaced the furthest away from the central axis 114. The shoulder portion 136 provides a predetermined depth of which the spring clip 101 is inserted into the panel 500.

As the spring clip 101 is inserted into the orifice 510, the opposing retention elements 122, 124, 132, 134 engage with the side profiles of the orifice 510, providing a resistive (i.e. friction) force against the spring clip 101. To overcome the resistive force, a force is applied to the spring 101 in the direction of insertion. As the opposing retention elements 122, 124, 132, 134 come into contact with the panel 500, the opposing retention elements 122, 124, 132, 134 are urged inward towards the central axis 114 such that the body portion 112 reduce in cross sectional area. More specifically, the inward movement of the opposing retention elements 122, 124, 132, 134 urge the first wall member 116 and the second wall member 118 of the body member 112 inwards such that the spring clip 101 is reduced in width to fit inside the orifice 510. The reduction of cross sectional area allows the spring clip 101 to be inserted into the panel 500. In some example embodiments, the base portion 102 forms a stop that prevents the spring clip 101 from being pulled through the orifice 510 of the panel 500.

The angling of the opposing retention elements 122, 124, 132, 134 also facilitates the removal of the spring clip 101 from the panel 500. After the spring clip 101 has been inserted into the panel 500, the opposing retention elements 122, 124, 132, 134 provide a resistive force that retains the spring clip 101 in place. However, when a force is applied that overcomes the resistive force, to remove the spring clip 101 from the panel 500, the opposing retention elements 122, 124, 132, 134 contact with the panel 500, urging the opposing retention elements 122, 124, 132, 134 inwards towards the central axis 114. This reduces the cross sectional area of the body portion 112, allowing the spring clip 101 to be removed from the panel 500.

Figure 6:
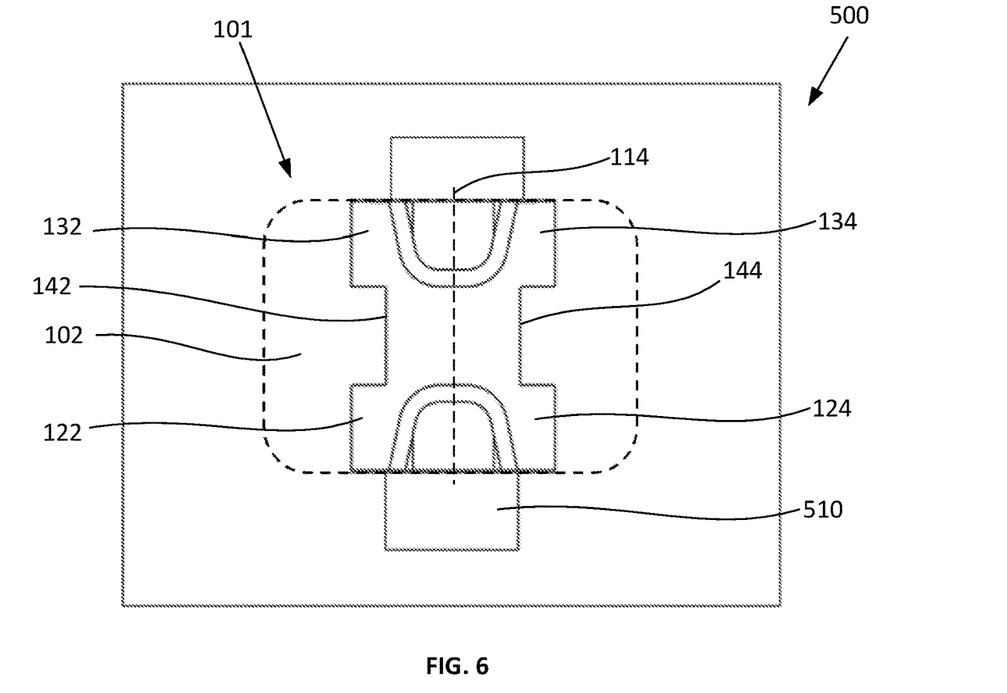
FIG. 6 illustrates a schematic top view of the spring clip assembly of FIG. 5, in a first configuration.
Figure 7:
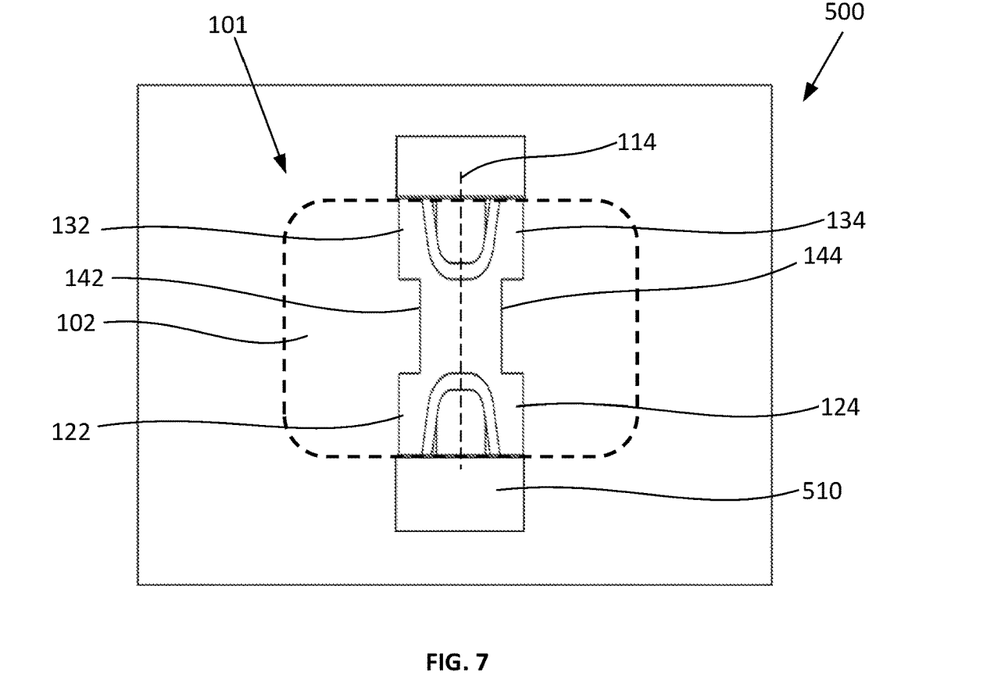
FIG. 7 illustrates a schematic top view of the spring clip assembly of FIG. 5, in a second configuration.

FIG. 6 shows the spring clip 101 that is partially inserted into the orifice 510 of the panel 500. The first pair of opposing retention elements 122, 124 engage with the orifice 510 of the panel 500 on one end of the orifice 510. The second pair of opposing retention elements 132, 134 engage with the orifice 510 of the panel 500 on another end of the orifice 510. When a force is applied to the spring clip 101 in a direction out of the page, the retention elements 122, 124, 132, 134 are urged inwards towards the central axis 114. This resiliently deforms the retention elements 122, 124, 132, 134 and subsequently deforms the first wall member 116 and the second wall member 118 inwards towards the central axis 114, as shown in FIG. 7. This deformation allows the cross sectional area of the body portion 112 to be temporarily reduced such that the spring clip 101 fits inside the orifice 510. With the reduced cross sectional area, the spring clip 101 can be inserted fully into the orifice 510. In some embodiments, the spring clip 101 deforms laterally inward and at the same time, also deforms axially in a direction out of the page.

When the spring clip 101 is fully inserted, the first and second wall members 116, 118 bias outwards away from the central axis 114, into a position shown in FIG. 6. This increases the lateral cross section area of the body portion 112 to its original size (i.e. before a force is applied to the spring clip 101). The shoulder portions 136 of the assembled spring clip 101 engage the spring clip 101 with the panel 500. This arrangement locks the spring clip 101 in place with respect to the surface of the panel 500. To remove the spring clip 101 from the panel 500, a force in the opposite direction (i.e. into the page of FIG. 6) is applied such that the retention elements 122, 124, 132, 134 are urged inwards towards the central axis 114. This allows the spring clip 101 to go through into the orifice 510 of the panel 500, such that the spring clip 101 can be removed.

When the spring clip 101 is assembled with the panel 500, the spring clip 101 and the panel 500 are together assembled with the dockhouse 1000 by slidingly engaging the base portion 102 of the spring clip 101 with the mounting member 1010. More specifically, the base portion 102 is inserted laterally into the dockhouse 1000 such that the upper surface 104 of the base portion 102 engages with the mounting member 1010. In this way, the spring clip 101 and panel 500 assembly is prevented from moving in a vertical direction relative to the dockhouse 1000. It is also envisaged that in some example embodiments, the spring clip 101 may be assembled with the dockhouse 1000, before the panel 500 is assembled with the spring clip 101 and the dockhouse 1000.

Figure 8:
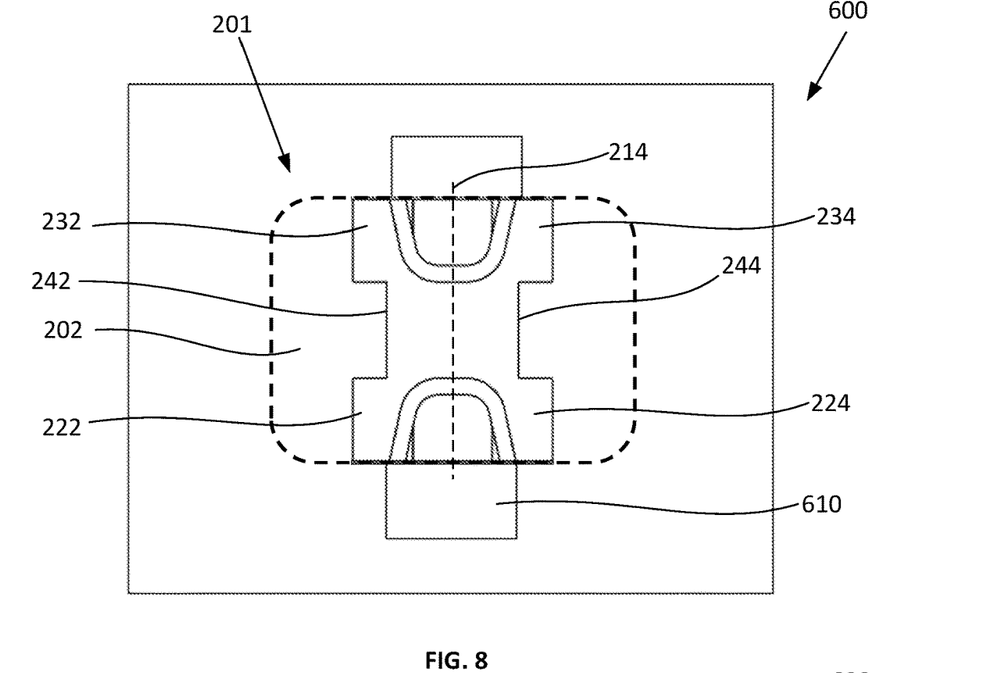
FIG. 8 illustrates a schematic top view of a spring clip assembly according to another embodiment, in a first configuration.
Figure 9:
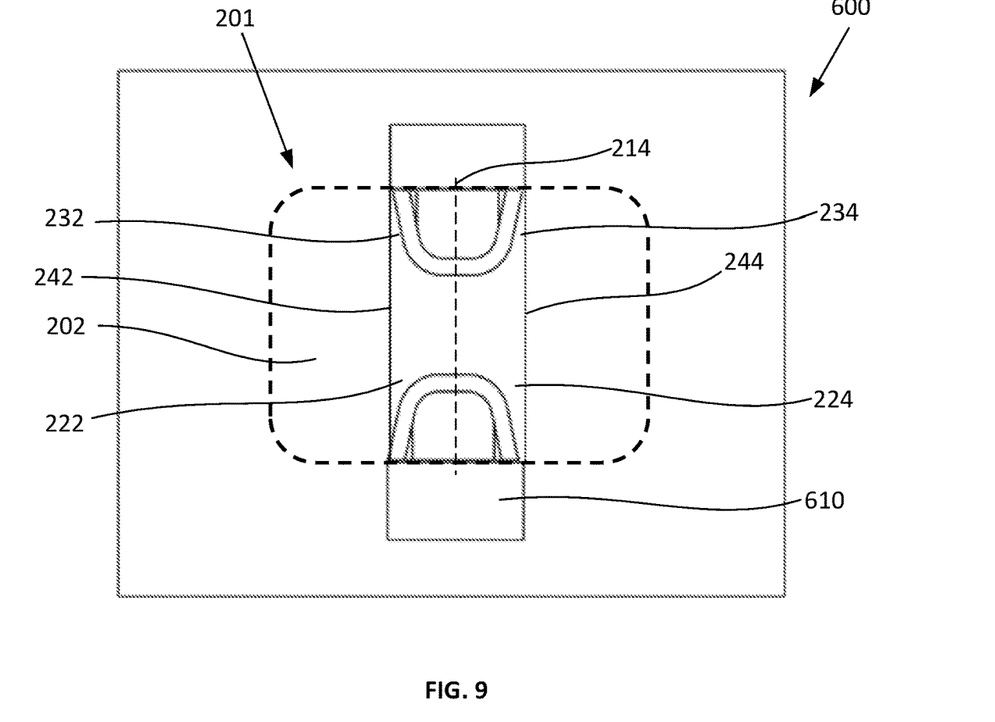
FIG. 9 illustrates a schematic top view of the spring clip assembly of FIG. 8, in a second configuration.

Referring now to FIGS. 8 and 9, there is provided a spring clip 201 assembled with a panel 600 and a vehicle structure 1000. In this example embodiment, the panel 600 is substantially the same as panel 500 as hereinbefore described and the vehicle structure 1100 is substantially the same as the vehicle structure 1000 as hereinbefore described.

FIG. 8 shows a spring clip 201 that is partially inserted into the orifice 610 of the panel 600. When the spring clip 201 is partially inserted, the retention elements 222, 224, 232, 234 engage with the orifice 610 of the panel 600. When a force is applied to the spring clip 201, in a direction out of the page, retention elements 222, 224, 232, 234 are urged inwards towards the central axis 214. This resiliently deforms the respective pairs of opposing retention elements 222, 224, 232, 234 inwards towards the central axis 114, as shown in FIG. 9. In this embodiment, only the retention elements 222, 224, 232, 234 deform inwards. The first wall member 216 and the second wall member 218 do not inwardly deform towards the central axis 214. The formation allows the cross section area of the body portion 112 to be temporarily reduced such that the spring clip 201 fits inside the orifice 610 of the panel 600. The spring clip 201 can therefore be fully inserted into the orifice 610.

After the spring clip 201 is fully inserted into the orifice 610 of the panel 600, the retention elements 222, 224, 232, 234 of the respective first pair of opposing retention elements 222, 224 and second pair of opposing retention elements 232, 234, resiliently bias outwards away from the central axis 214. The locking of the spring clip 201, the removal of the spring clip 201 from the panel 600, and the assembly of the spring clip 201 and panel 600 with the dockhouse (not shown) are substantially as hereinbefore described with reference to FIGS. 5 to 7.

Through the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract or drawings), or to any novel one, or any novel combination, of the steps of any method or process so disclosed.

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible.

The invention claimed is:

1. A spring clip for coupling a panel to a vehicle structure having at least one mounting member, the spring clip comprising:
  a base portion, having an upper and lower surfaces, configured to couplingly engage with the mounting member; and
  a body portion, having a central axis extending away from said lower surface of said base portion and comprising a first planar wall member and a second planar wall member, opposingly spaced apart from said first planar wall member with regards to said central axis, each one of said first and second planar wall members extending away from said lower surface towards and joiningly converging into a distal end on said central axis, said body portion further comprising:

at least a first pair of opposing retention elements, each one disposed on and extending laterally outwards from a respective one of said first and second planar wall member, configured to fixingly engage when inserted into an orifice of the panel, during use; and a first rib member having a length that extends from said first planar wall member towards said distal end, wherein said first rib member is integrally connected, along its length, to a first one of the opposing retention elements.

2. A spring clip according to claim 1, comprising a second pair of opposing retention elements laterally spaced apart from said first pair of opposing retention elements on an outer wall surface of a respective one of said first and second planar wall members.

3. A spring clip according to claim 2, wherein each one of said first pair of opposing retention elements and said second pair of opposing retention elements forms a shoulder portion adapted to lockingly engage with a surface of the panel, during use.

4. A spring clip according to claim 1, wherein each one of said first and second planar wall member is resiliently biased in a direction laterally away from said central axis.

5. A spring clip according to claim 1, wherein said first planar wall member and said second planar wall member are cooperatively deformable so as to temporarily reduce the lateral cross-sectional area of said body portion.

6. A spring clip according to claim 1, wherein each one of said first pair of opposing retention elements is integrally formed from respective one of said first and second planar wall member.

7. A spring clip according to claim 1, wherein each one of said second pair of opposing retention elements is integrally formed from respective one of said first and second planar wall member.

8. A spring clip according to claim 1, wherein said body portion comprises a polymer.

9. A spring clip according to claim 8, wherein said polymer comprises one or more of polypropylene, polyvinyl chloride and polyethylene.

10. A spring clip according to claim 1, wherein said first rib member is integrally formed with said first planar wall member.

11. A spring clip according to claim 1, further comprising a second rib member having a length that extends from said second planar wall member towards said distal end, wherein said second rib member is integrally connected, along its length, to a second one of the opposing retention elements.

12. A spring clip according to claim 11, wherein said second rib member is integrally formed with said second planar wall member.

13. A spring clip according to claim 1, wherein said central axis of said body portion extends substantially perpendicularly away from said lower surface of said base portion.

14. A spring clip according to claim 1, wherein said upper and lower surfaces are orientated in a plane that intersects said central axis of said body portion.

15. A spring clip for coupling a panel to a vehicle structure having at least one mounting member, the spring clip comprising:
a base portion, having an upper and lower surfaces, configured to couplingly engage with the mounting member; and
a body portion, having a central axis extending away from said lower surface of said base portion and comprising a first planar wall member and a second planar wall member, opposingly spaced apart from said first planar wall member with regards to said central axis, each one of said first and second planar wall members extending away from said lower surface towards and joiningly converging into a distal end on said central axis, said body portion further including at least a first pair of opposing retention elements, each one disposed on and extending laterally outwards from a respective one of said first and second planar wall member, configured to fixingly engage when inserted into an orifice of the panel, during use;
wherein the base portion includes a first segment extending outward from the first planar wall member to a first free end, and a second segment extending outward from the second planar wall member to a second free end, wherein the upper surface, along the first segment to the first free end, is substantially continuous and planar, wherein the upper surface, along the second segment to the second free end, is substantially continuous and planar;
wherein the base portion includes a third segment that extends between and connects the first planar wall member and the second planar wall member.

16. A spring clip for coupling a panel to a vehicle structure having at least one mounting member, the spring clip comprising:
a base portion, having an upper and lower surfaces, configured to couplingly engage with the mounting member; and
a body portion, having a central axis extending away from said lower surface of said base portion and comprising a first planar wall member and a second planar wall member, opposingly spaced apart from said first planar wall member with regards to said central axis, each one of said first and second planar wall members extending away from said lower surface towards and joiningly converging into a distal end on said central axis, said body portion further including at least a first pair of opposing retention elements, each one disposed on and extending laterally outwards from a respective one of said first and second planar wall member, configured to fixingly engage when inserted into an orifice of the panel, during use, and a first rib member extending from said first planar wall member towards said distal end, wherein said first planar wall member includes an inner planar surface facing the second planar wall member, and the first rib member includes an inner planar surface that lies in a same plane with the inner planar surface of the first planar wall member;
wherein the body portion includes a second rib member extending from said second planar wall member towards said distal end, wherein said second planar wall member includes an inner planar surface facing the first planar wall member, and the second rib member includes an inner planar surface that lies in a same plane with the inner planar surface of the second planar wall member.

* * * * *